(12) United States Patent
Buch

(10) Patent No.: US 6,901,522 B2
(45) Date of Patent: May 31, 2005

(54) SYSTEM AND METHOD FOR REDUCING POWER CONSUMPTION IN MULTIPROCESSOR SYSTEM

(75) Inventor: Deep K. Buch, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 647 days.

(21) Appl. No.: 09/876,609

(22) Filed: Jun. 7, 2001

(65) Prior Publication Data

US 2002/0188877 A1 Dec. 12, 2002

(51) Int. Cl.⁷ .............................. G06F 1/32; G06F 9/46
(52) U.S. Cl. ...................................... 713/320; 718/104
(58) Field of Search ........................... 713/320; 718/104

(56) References Cited

U.S. PATENT DOCUMENTS

| | | | | |
|---|---|---|---|---|
| 5,615,370 A | * | 3/1997 | Nagai | .......................... 718/102 |
| 6,122,745 A | | 9/2000 | Wong-Insley | |
| 6,131,166 A | | 10/2000 | Wong-Insley | |
| 6,141,762 A | | 10/2000 | Nicol et al. | |
| 6,269,391 B1 | * | 7/2001 | Gillespie | .................... 718/100 |
| 6,711,691 B1 | * | 3/2004 | Howard et al. | ............. 713/300 |
| 6,732,139 B1 | * | 5/2004 | Dillenberger et al. | ........ 718/102 |

OTHER PUBLICATIONS

Michael Kanellos, Transmeta–based servers boast power–saving chips, Jan. 25, 2001, pp 1–3, c/net News.com Tech news first.
Process and Thread Functions, Dec. 5, 2000, pp 1–4, Microsoft Corporation.
Server Design FAQ, Version 1.0, Jul. 2, 1999, pp 1–39, Intel Corporation and Microsoft Corporation.

* cited by examiner

Primary Examiner—Lynne H. Browne
Assistant Examiner—Eric Chang
(74) Attorney, Agent, or Firm—Blakely, Sokoloff, Taylor & Zafman LLP

(57) ABSTRACT

A method and apparatus for power management is disclosed. The invention reduces power consumption in multiprocessing systems by dynamically adjusting processor power based on system workload. Particularly, the method and apparatus determines the number of required processors based on the number or active threads and sets a processor affinity to run the active threads on the determined number of required processors, thereby allowing the free processors to enter a low-power state.

22 Claims, 3 Drawing Sheets

SYSTEM AND METHOD FOR REDUCING POWER CONSUMPTION IN MULTIPROCESSOR SYSTEM

FIELD

The invention is related to processors and more particularly, to power management in multi-processor systems.

GENERAL BACKGROUND

In recent years, advances in technology have led to more powerful computing devices. For example, a server used in business transaction processing or e-commerce may require simultaneous execution of a high volume of transactions. Accordingly, server systems are typically set to process the highest expectant volume of transactions or workload. Nevertheless, servers run, during much of the time, at a fraction of the peak capacity. Regardless of the workload, however, these systems generally run at nearly full power, thereby consuming great amounts of electrical power. Particularly, as millions surf the World Wide Web and organizations (including corporations and government) use the Internet to implement more of their business, internet servers form the core of e-business and tend to be massive consumers of power.

In addition, a system running at nearly full power dissipates large amounts of heat, requiring cooling fans which create a high decibel noise. The cooling and power distribution requirements also limit the number of server systems that can be stacked in "racks". As a result, internet data centers are faced with increasing infrastructure requirements for space, cooling, and electrical power. Furthermore, for computing devices with a finite source of power such as portable computers, power consumption can limit the usage time as well as generate uncomfortable heat for users. Therefore, power management can be critical for any computing devices.

Currently, some Operating Systems (OS) have built-in power management. For example, Advanced Configuration and Power Interface (ACPI) compliant hardware can support dynamic power management under the control of an OS, for example MICROSOFT WINDOWS® 2000. Based on the Central Processing Unit (CPU) usage, the MICROSOFT WINDOWS® 2000 dynamically controls the power consumed. Under MICROSOFT WINDOWS® 2000, the OS defines "CPU usage" as "time not spent in the OS idle loop". On ACPI systems, the OS transitions the CPU into a low power state when idle. This reduces the CPU power consumption.

Nevertheless, in a Java application server environment, the ability of an OS to efficiently manage CPU power is limited. Particularly, as seen at the level of an OS, the Java application server software and the Java Virtual Machine (JVM) can appear to consume a large percentage of the CPU time, even under relatively light user load. As the OS has limited visibility into the actual CPU usage of the server system, the OS cannot efficiently manage power on its own with the existing mechanisms. For example, threads could be in a spin loop or doing housekeeping tasks, which does not require full CPU power usage. Moreover, when the JVM makes use of a user-level threads library, the OS's visibility into the actual CPU usage is reduced further since the OS sees only a few active threads, while a large number of user threads are mapped on top of the OS native threads.

BRIEF DESCRIPTION OF THE DRAWINGS

The invention will be described in detail with reference to the following drawings in which like reference numerals refer to like elements wherein.

DETAILED DESCRIPTION

A method and apparatus for reducing power consumption is disclosed. In the following description, numerous specific details are set forth to provide a thorough understanding of the invention. However, it will be understood by one of ordinary skill in the art that the invention may be practiced without these specific details. For example, although the invention will be described with reference to a Java application server environment, the same techniques and teachings can be applied to other types of systems, environments or platforms.

Disclosed herein, a "thread" is a sequence of computing instructions that make up a program. Within a program, a single thread can be assigned to execute one task or multiple threads can be assigned to execute more than one task at a time. Typical multiprocessing systems can have four to eight (or more) individual processors sharing processing tasks. Therefore, by breaking down a process into multiple threads, different processors in the system can be operating on different portions or tasks of the process at the same time. Also, the term "computer readable medium" includes, but is not limited to portable or fixed storage devices, optical storage devices, and any other memory devices capable of storing computer instructions and/or data. Here, "computer instructions" are software or firmware including data, codes, and programs that can be read and/or executed to perform certain tasks. In addition, the terms "processor" and "central processing unit" (CPU) refer to circuitry that controls various functions of a computer system and will be used interchangeably.

Figure 1:
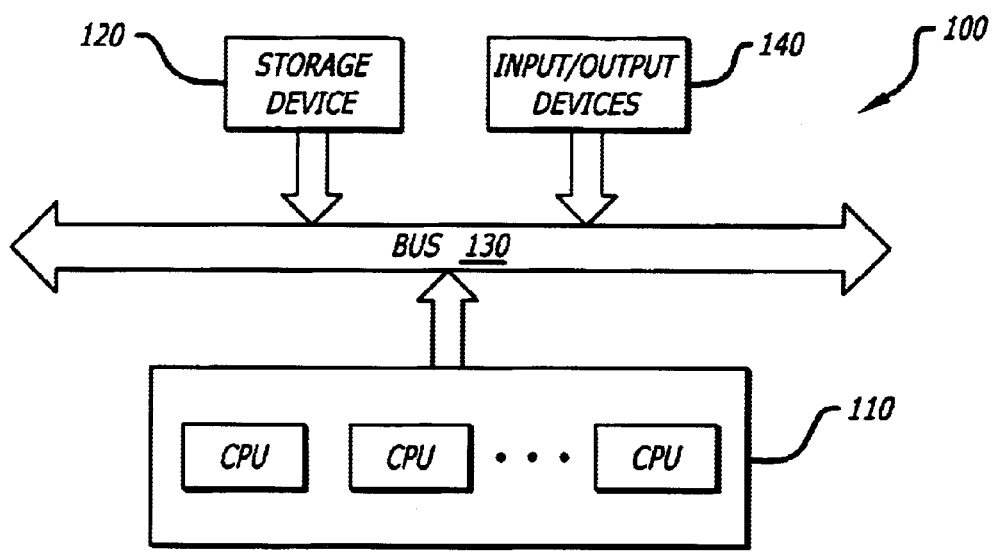
FIG. 1 shows an exemplary system to which a power management in accordance with the invention can be implemented.

An example of a multiprocessing system 100 implementing the principles of the invention is shown in FIG. 1, including a plurality of processors 110, a storage device 120 and a bus 130. The processors 110 are coupled to the storage device 120 by the bus 130. A number of input/output devices 140 such as a keyboard, mouse and displays can also be coupled to the bus 130.

The memory 120 stores computer programs such as an operating system (OS), application software, utility software, Java servlets or applets, and other/or other instructions which are executed by the processors 110. An OS manages the basic operations of a system such as determining how and in what order assigned tasks are to be handled, managing the flow of information into and out of the processor(s), receiving inputs from a keyboard and sending outputs to a display. Here, the system 100 and an OS form a platform.

An application software runs on top of the OS and performs a specific task for a user using services offered by the OS. An application software is usually designed to run on a particular OS because various operating systems operate in different ways. However, Java application software is generally platform independent and can be run on different platforms without alteration.

Figure 2:
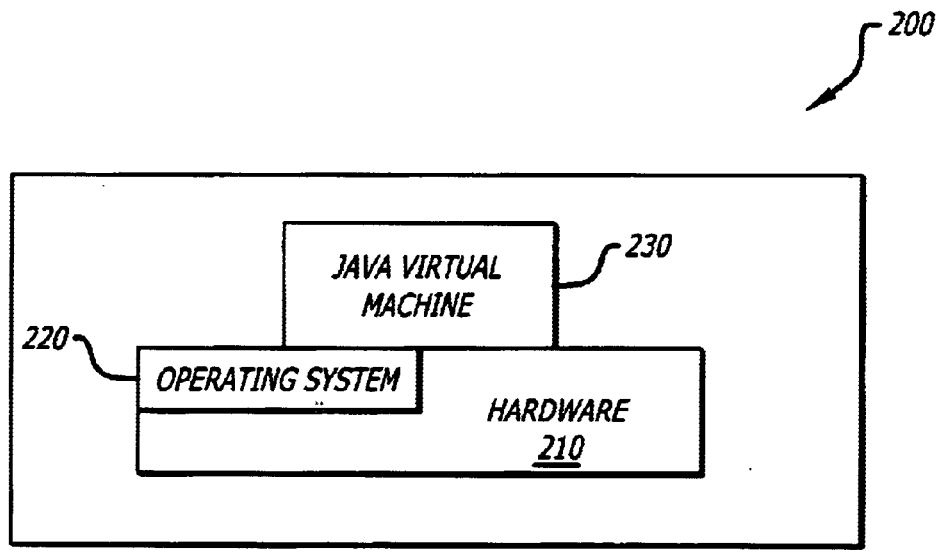
FIG. 2 shows an exemplary Java application system environment.

Java is an object-oriented language compiled into a format called bytecode. The Java bytecodes are designed to be executed on a Java Virtual Machine (JVM). The JVM is not an actual hardware platform, but is a low-level software emulator that can be implemented on many different computer processor architectures and under many different operating systems. FIG. 2 shows an exemplary Java application system 200 including a JVM. The system 200 includes computer hardware 210 controlled by OS 220 and a JVM 230 for running Java programs 290. The JVM 230 running on the system 200 relies on services from the underlying OS 220 and the computer hardware 210.

Figure 3:
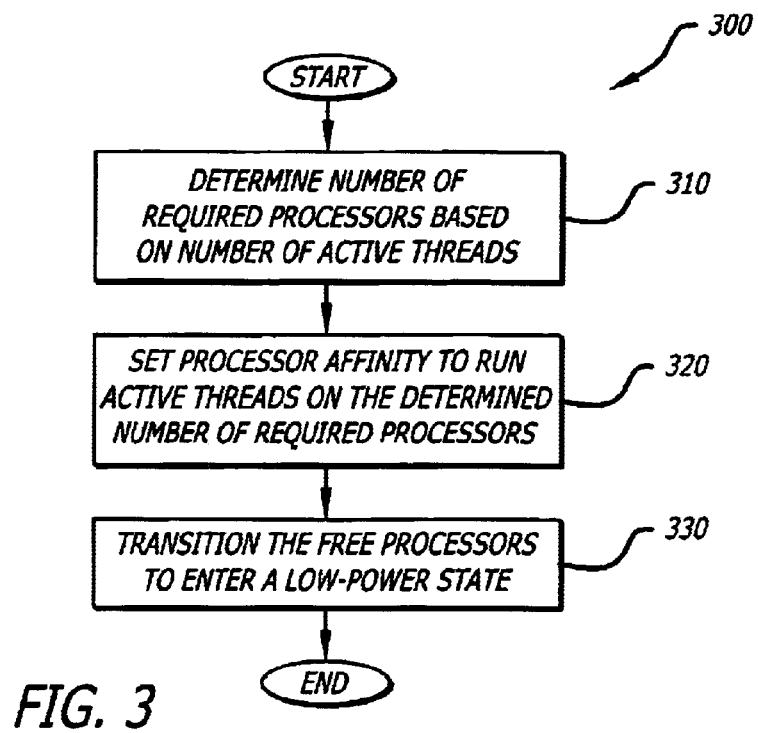
FIG. 3 is a flowchart showing the power management in accordance with one embodiment of the invention.

FIG. 3 is a flowchart showing power management of a Java application system environment in accordance with one embodiment of the invention. The JVM periodically monitors the state of Java threads to determine the number of threads in active processing and the number of threads in a "blocked" or "idle" state. For example, a web server may have an allocated pool of 50 worker threads for processing Hypertext Transfer Protocol (HTTP) connection requests. However, at light load, a few of these threads will actually be processing requests while the other remaining threads will be blocked waiting for client connection attempts. In some cases, the states of threads may be seen as blocked by the JVM but not by the OS. For example, threads which are waiting to acquire a required synchronization or mutex object may be considered "blocked" by the JVM. However, the same threads may simply be considered "running" from the OS viewpoint.

Based on the number of active threads, the JVM then determines the number of required processor (block 310) in order to efficiently perform the tasks of the system. Particularly, the JVM determines the total number "n" of processors in the system. Here, the JVM can determine the number of processors through an OS Application Programming Interface (API) call. The JVM then determines a ratio of active threads to processors required for good performance, depending on the type of processing. For example, if the threads are mostly doing Input/Output (I/O) or other high-latency tasks, a higher ratio of threads to processor is used. On the other hand, if threads are mostly doing CPU-intensive processing and less I/O, a lower ratio of threads to processor is used, for example, 1 thread per CPU.

Based on the determined ratio, the JVM determines the number "k" of required processors out of the total number n of processors, wherein k is determined as follows:

$$k = (\text{number of active threads})/(\text{ratio of active threads to processors}) \quad [\text{Equation 1}]$$

The remaining number, i.e. (n−k), of processors can be transitioned into low-power states. For example, if there are 15 active threads and the optimum ratio of active threads to processors is 3:1, k=15/3 and five processors are required to run the system tasks. Assuming an 8-CPU system, three CPUs can be placed into a low-power state.

Upon determining the number of required processors, the JVM makes a system call to the OS to set a processor affinity of the entire Java thread pool (block 320), including the JVM's own threads. A processor affinity means forcing threads to run a specific subset of processors and is set as follows:

$$\text{Affinity}(\text{Thread } 1 \ldots t) = \text{processors} 1 \ldots k, 1 \leq k < n \quad [\text{Equation 2}]$$

Namely, equation 2 forces the entire pool of threads 1 to t to run on processors 1 to k out of n processors. For example, in MICROSOFT WINDOWS® 2000, the API call "SetProcessAffinityMask" can be used to set the processor affinity.

Figure 4:
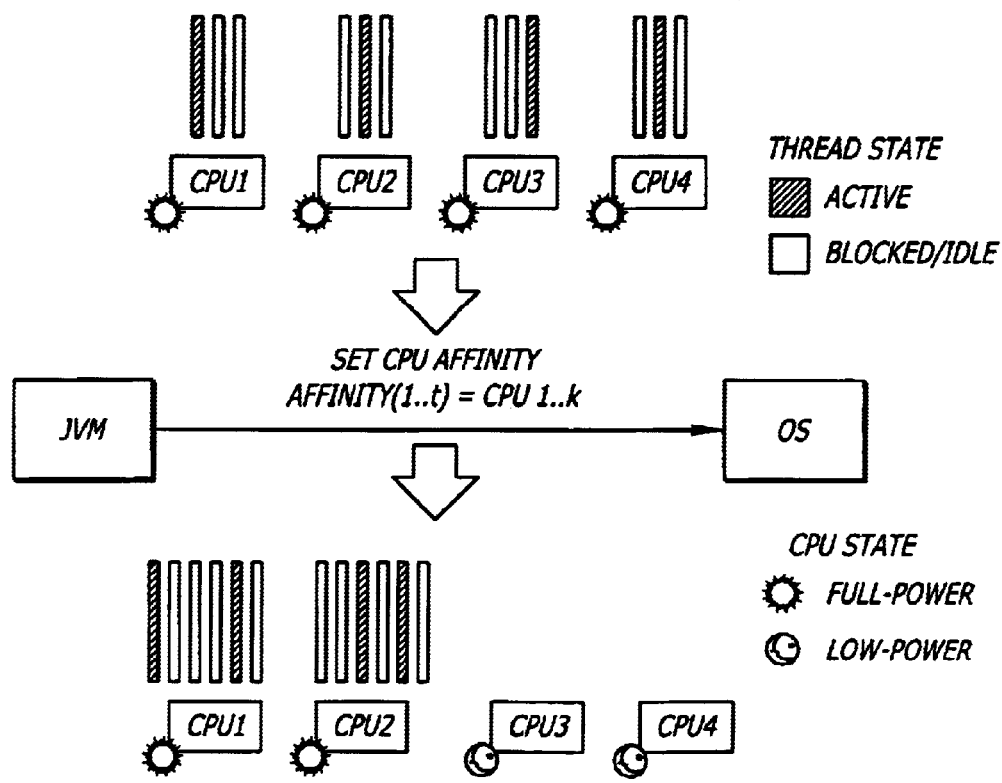
FIG. 4 shows an exemplary result of applying the power management in accordance with one embodiment of the invention.

Accordingly, the OS assigns the desired processor affinities to the Java threads and causes all of Java to run on k processors, leaving (n−k) processor to run the OS idle loop. Therefore, the (n−k) CPUs enter(s) the low-power state (block 330). Here, the CPUs can enter the low-power states using a typical OS Advanced Configuration and Power Interface (ACPI) mechanism. FIG. 4 shows an exemplary result of the present power management on a 4-CPU system. Prior to power management, the CPU1 to CPU 4 are in full-power state to run active and blocked/idle threads. By setting the appropriate processor affinity, the active and blocked/idle threads are run on CPU1 and CPU2 while CPU 3 and CPU4 are transitioned into low-power states.

The reverse procedure is used when the JVM determines that the system load has increased. This requires another call into OS to set the processor affinities. As large-scale changes to the system workload tend to occur gradually in servers running enterprise or e-business applications, the performance overhead of the above procedure is expected to be small. In addition, the procedure described above is a minimal implementation of the invention. Because the OS has various services which periodically will run on the (n−k) processors, a fine-grained hardware/software support for processor power management can further improve the performance of the system. In such systems, the procedure is extended as follows.

If an OS API is available to set individual CPU's power state, the JVM can use this API to specifically request the OS to transition (n−k) CPUs into deep sleep and/or turn off associated cooling devices such as fans. If a Java API allows the JVM to expose the above OS API to Java applications, the Java application software can use the Java API to achieve the same end results.

Figure 5:
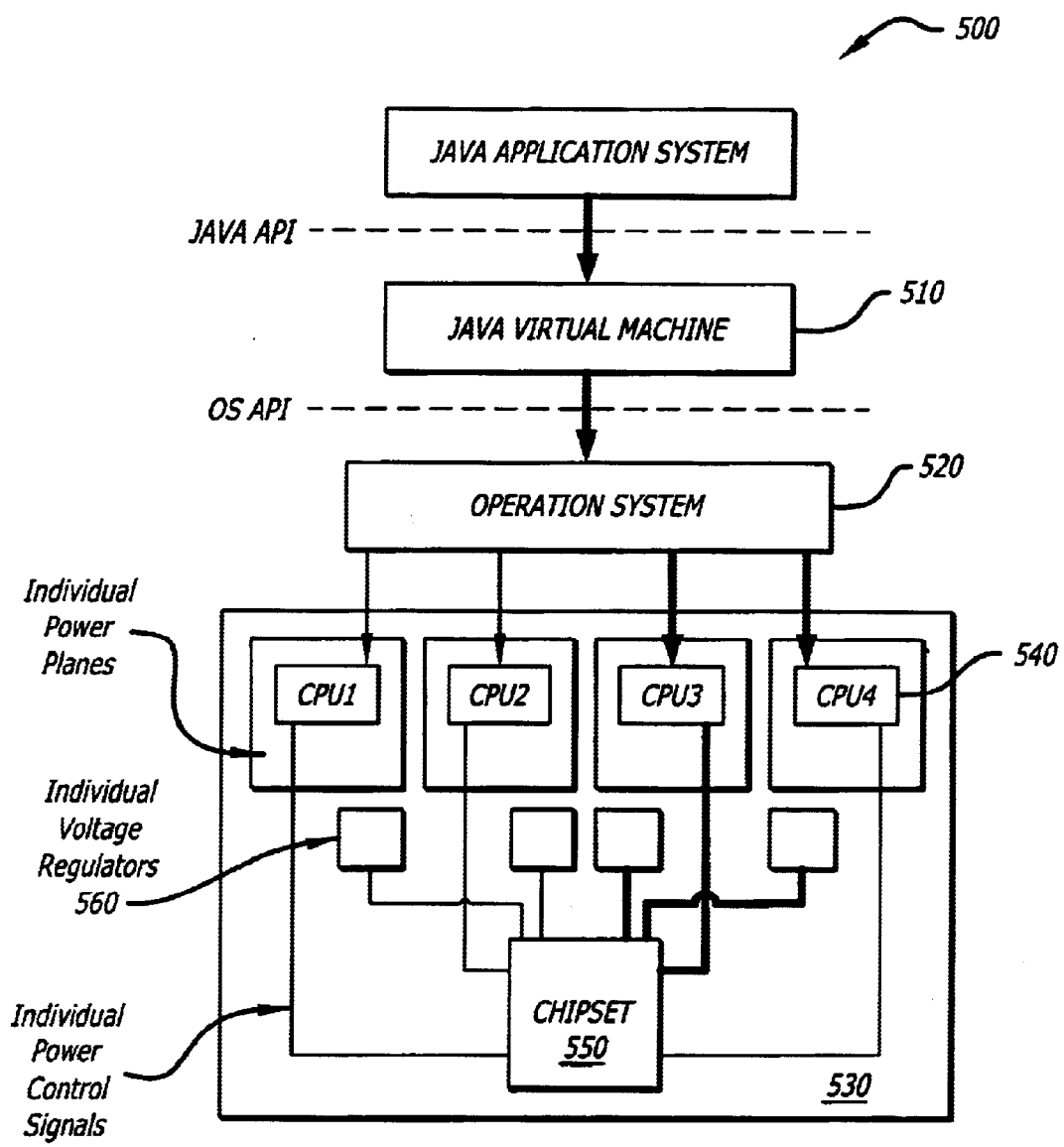
FIG. 5 shows an exemplary system which allows a fine-grained power control in accordance with one embodiment of the invention.

FIG. 5 shows one embodiment of a fine-grained power control mechanism in a Java application server environment 500. The system 500 includes a JVM 510 on top of an underlying operating system 520 and computer hardware 530. The computer hardware 530 includes a plurality of CPUs 540 coupled to a chipset 550 and individual voltage regulators 560 for each CPUs 540. Using the chipset 550 and the voltage regulators 560, separate power control signals can be used to transition particular CPUs into a "deep sleep" state and/or turn off associated cooling devices. Therefore, power states of individual CPUs 540 can be controlled to achieve a fine-grained power control.

One particular application of the power management in accordance to the present invention is in server systems, which currently lacks support for fine-grained power control of individual CPUs. Server chipsets connect a single "stop-clock" output to all the CPUs' input pins, thereby making it impossible to selectively throttle a particular CPU. Also, there is currently no OS API that allows a server application to inform the OS that it no longer needs to use a certain number of CPUs so that the OS can transition those CPUs into a deep sleep state. However, the power management in accordance to the invention allows fine-grained power control and can be implemented in a platform that follows the ACPI standard. Therefore multiprocessor systems can provide the performance when needed, for example, performance on-demand by dynamically bringing more CPU's on-line to meet increased server workload. On the other hand, CPU power consumption can be scaled back depending on the server workload, thereby saving power at low system utilization.

Accordingly, implementation of the invention results in extensive power savings. The low-power states such as deep sleep can save significant CPU power, while the associated cooling systems can be turned off, further reducing power consumption. Also reducing the noise level. Furthermore, the invention addresses multiprocessor servers in a Java application server environment,.

In addition, the technique above can be implemented in run-time environments other than Java application systems such as MICROSOFT®.NET. The invention can be implemented in any system with a layer of software above the OS that has visibility into the processing needs of the application system. Also, the technique can be applied to different operating systems including MS Windows and Linux. Furthermore, the technique can be modified to cover a broader range of systems and software (i.e. non-Java case).

Namely, a "watchdog" thread can be implemented within an OS, whose function is to monitor the states and the processing nature of the other threads in the system. The watchdog thread would perform similar calculation as the JVM above and make a call to the OS to request that (n–k) CPUs be put into a low-power state. For example, the watchdog thread functionality can be implemented in Windows native threads library, Linux native thread library, and User (green) threads library that may sit on top of the OS native libraries.

As discussed above, the present power management in accordance with the invention allows a selected number of processors, based on the amount of workload, to enter low-power states, thereby reducing the overall power consumption. As a result, the system level and the CPU level power consumption would significantly fall at lower workload levels. Therefore, the systems can be efficiently operated at reduced costs, even with power supply constraints.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method comprising:
   determining a number of required processors in a system based on a number of active threads, comprises
      determining a ratio of active threads to the number of required processors to process the active threads, the ratio being based on a type of processing associated with the active threads, and
      dividing the number of active threads by the determined ratio;
   setting processor affinity to run the active threads on k number of processors, the k number of processors determined as being the number of required processors; and
   transitioning processors other than the k number of processors to enter a low-power state.

2. The method of claim 1, wherein determining the ratio based on the type of processing.

3. The method of claim 1, wherein transitioning processors other than the k number of processors into a deep sleep state.

4. The method of claim 1, further comprising turning off unnecessary periodic services running on processors other than the k number of processors.

5. The method of claim 1, wherein the system is a Java application server.

6. The method of claim 1, further comprising assigning a watchdog thread on an operating system of the system to monitor the state of the system threads to determine the number of required processors.

7. A system comprising:
   an operating system; and
   a virtual machine to determine a number of required processors in the system based on a number of active threads by determining a ratio of active threads to the number of required processors to process the active thread and dividing the number of active thread by the determined ratio, the ratio being based on a type of processing associated with the active threads, the virtual machine to cause the operating system to at least set processor affinity to run the active threads on k number of processors, the k number of processor determined as the number of required processors, and
   transition processors other than the k number of processors to enter a low-power state.

8. The system of claim 7, further comprising voltage regulators corresponding to each processor, the voltage regulator to allow separate power state control of the plurality of processors.

9. The system of claim 8, wherein the virtual machine to further cause the operating system to transition processors other than the k number of processor into deep sleep.

10. The system of claim 8, wherein the virtual machine to further cause the operating system to turn off unnecessary periodic services running on processors other than the k number of processors.

11. The system of claim 7, wherein the virtual machine is a Java virtual machine.

12. A method comprising:
   assigning a first thread to monitor the states of other threads in a system, the first thread to determine the number of active threads in the system;
   determining a number of required processors in the system based on a number of active threads, comprises:
      determining a ratio of active threads to the number of required processors to process the active threads; based on the type of processing, and
      dividing the number of active threads by the determined ratio;
   setting processor affinity to run the active threads on k number of processors, the k number of processor determined as the number of required processors; and
   transitioning processors other than the k number of processors to enter a low-power state.

13. The method of claim 12, wherein transitioning processors other than the k number of processors into deep sleep.

14. A system comprising:
   means for determining a number of required processors in a system based on a number of active threads by determining a ratio of active threads to the number of required processors to process the active threads, the ratio being based on a type of processing associated with the active threads, and dividing the number of active threads by the determined ratio to determine the number of required processors;
   means for setting processor affinity to run the active threads on k number of processors, the k number of processor determined as the number of required processors; and means for transitioning processors other than the k number of processors to enter a low-power state.

15. The system of claim 14, further comprising means for transitioning processors other than the k number of processors into deep sleep.

16. The system of claim 14, further comprising means for turning off unnecessary periodic services running on processors other than the k number of processors.

17. A system comprising:

a Java virtual machine to determine a number of required processors in a system based on a number of active threads, the Java virtual machine determines a ratio of active threads to the number of required processors to process the active threads, the ratio being based on a type of processing associated with the active threads, and divides the number of active threads by the determined ratio to determine the number of required processors; and an operation system caused by the Java virtual machine to at least:

set processor affinity to run the active threads on k number of processors, the k number of processor determined as the number of required processors, and transition processors other than the k number of processors to enter a low-power state.

18. The system of claim 17, wherein the Java virtual machine further causes the operation system to transition processors other than the k number of processors into a deep sleep state.

19. The system of claim 17, wherein the Java virtual machine further causes the operation system to turn off unnecessary periodic services running on processors other than the k number of processors.

20. A program loaded in a computer readable medium comprising:

a first group of computer instructions to determine a number of required processors in a system based on a number of active threads and a type of processing associated with the active threads;

a second group of computer instructions to set processor affinity to run the active threads on k number of processors, the k number of processor determined as the number of required processors; and a third group of computer instructions to transition processors other than the k number of processors to enter a low-power state.

21. The program of claim 20, further comprises computer instructions to transition processors other than the k number of processors into deep sleep.

22. The program of claim 20, further comprising computer instructions to turn off unnecessary periodic services running on processors other than the k number of processors.

* * * * *